Figure 1:
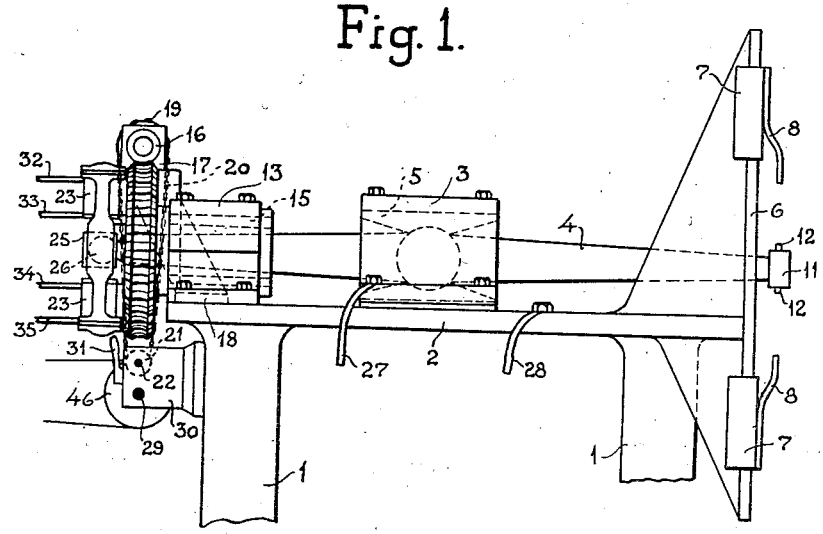

Dec. 12, 1939.       H. F. M. HOLLESEN         2,183,219
DEVICE FOR ELECTRIC WELDING
Filed April 21, 1938

Henrik Frederik Moldrup Hollesen
INVENTOR

By *[signature]*
his ATTY.

Patented Dec. 12, 1939

2,183,219

UNITED STATES PATENT OFFICE 2,183,219

DEVICE FOR ELECTRIC WELDING

Henrik Frederik Moldrup Hollesen, Copenhagen, Denmark

Application April 21, 1938, Serial No. 203,314
In Denmark April 24, 1937

1 Claim. (Cl. 219—4)

My invention relates to improvements in devices for electric welding, more especially in devices for electric welding of annular joints.

Such annular joints occur often in the manufacturing of different objects. As an example of such weldings may be mentioned the welding of mutually engaging annular necks connecting radiator units produced from pressed steel plates.

The objects of my improvement are first to obtain a stress-free welding joint, obviating the difficulties arising from the parts being heated during the welding process, second to produce a very accurate and tight welding joint of the kind specified.

Welding of annular joints causes frequently considerable difficulties, especially in the case of series manufacture, the mutually engaging flanges being made with a certain tolerance (permissible limit of accuracy). It has thus been attempted to weld such joints by the use of welding burners and by the use of resistance welding, a pressure roller rotating on the inside in the joint having been used as the one electrode. Neither one of these methods, however, can give a stress-free welding, because the material forming the joint is heated greatly during the welding and, consequently, will expand. When therefore the welding is commenced at a certain point of the joint, and is slowly continued along the latter, until the starting point is reached again, the various parts of the joint will be exposed to a slowly progressive heating and subsequent cooling after the heated parts have been connected, whereby considerable welding stresses are produced in the joint. These stresses may cause the joint to warp.

By the present process for electric welding of such annular joints, this drawback is obviated in that the one welding pole is swung and, at the same time, is rotated in such a manner relatively to the joint that the latter is welded alternately at diametrically opposite points which travel uniformly along the joint, gradually as the welding proceeds.

When according to this process the welding is commenced at some point or other of the joint, the work is not continued at a neighbouring point but a point diametrically opposite the point first welded, after which the welding is continued at a point adjacent to the first point and then at a point diametrically opposite the latter. Thus the advantage is attained that there will be ample time for cooling of the parts of the joint between the welding of one point and the welding of the adjacent point, in such a manner that the welding is practically always performed at cold points and, in consequence thereof, the stresses resulting from later cooling are avoided. In consequence hereof, a very accurate and tight welding is attained.

The principal idea underlying the invention can be utilized in many different manners. Generally, it will be simplest to let the swinging and rotating pole be the welding pole disposed at the inner side of the joint, while stationary clamping poles engaging the outer edge of the joint are used as an outside pole. The invention, however, is not limited to such a construction, as a stationary inner pole formed as a clamping arbor can very well be used in connection with a swinging outer pole moved in the manner indicated.

Generally, it will be simplest to maintain stationary the articles to be welded together, and to move one of the poles in the indicated manner, but the articles may also be allowed to rotate during the welding operation, especially when a stationary central pole and swinging outer poles are used, as the welding machine can then be constructed in such a manner that the outer poles are swung forward and back, at the same time as the article to be welded is rotated about the stationary or rotary central pole.

The larger the articles to be welded together are, the more difficult it will be, however, to swing them around during the welding, so that when the question is to weld the necks in radiator units, it will generally be necessary to maintain the radiator units clamped in a holder, while the motion is left to the welding poles, especially so that the inner pole performs the entire motion, while the outer poles are maintained stationary.

Figure 2:
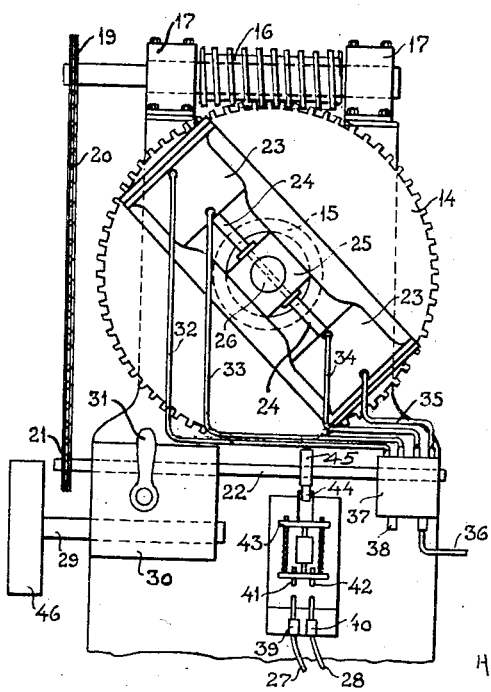
Figure 3:
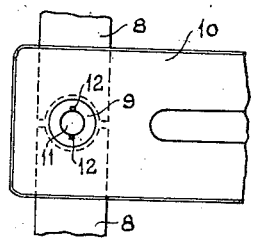
Figure 4:
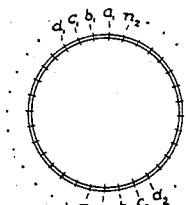

In order that my invention may be better understood a machine for executing the same shall be described in the following with reference to the drawing, in which:

Fig. 1 shows the machine diagrammatically, in side elevation,

Fig. 2 the same viewed from the lefthand side in Fig. 1,

Fig. 3 a radiator unit arranged in position relatively to the welding poles, and Fig. 4 diagrammatically, the distribution of the welding points along the joint.

As shown in Fig. 4, the welding according to the invention is effected in such a manner that the work is commenced at a point $a_1$ and is continued at the point $a_2$, and then is taken up at the point $b_1$ and is continued at the point $b_2$, etc., through the points $c_1$, $c_2$, $d_1$, $d_2$, etc., until the points $n_1$ and $n_2$ are reached, which are adjacent to the points $a_2$ and $a_1$, respectively, after which the welding is finished. It is thus seen that the movable member has only to be rotated one half revolution, if there are used on the pole two welding projections disposed at diametrically opposite points.

The welding machine shown on the drawing consists mainly of a frame 1, 2 with a horizontal supporting plate 2, on which a bearing 3 is provided, in which a two-armed lever 4 is supported in spherical shells 5, in such a manner that the arm 4 can be swung, as well as be rotated, about its axis in the bearing 3.

The frame 1, 2 is further fitted with a guide 6 for slides 7 adapted to move up and down on said guides, and supporting pole members 8, which as shown in Fig. 3 can be clamped together on the outside of the joint to be welded. This joint may for instance be formed between two telescoping necks along the connecting opening 9 on two radiator units 10 to be welded together. One end 11 of the lever 4 projects through the guide 6. This end supports two welding projections 12 disposed diametrically opposite one another.

On the opposite side of the supporting plate 2, a bearing 13 is disposed in which a worm wheel 14 is journalled, which has a hub 15 with an inner bore through which the end of the lever 4 passes freely, in such a manner that it can perform a swinging motion in the bearing 3, without striking the inner face of the hub 15. The worm wheel 14 is in engagement with a worm 16 journalled in bearings 17 on brackets 18 on the frame 1, 2. In rigid connection to the shaft of the worm, a chain wheel 19 is provided, which cooperates with a chain 20 engaging a chain wheel 21 on an intermediate shaft 22 in driving engagement with a main shaft 29 through a reversing gear box 30 with operating handle 31.

On the rear side of the worm wheel 14 in the construction shown, two cylinders 23 are disposed, in which cylinders pistons with piston rods 24 can be moved forth and back, when compressed air is admitted into the cylinders 23 or let out therefrom through air pipes 33—35. The piston rods 24 are connected to a sliding block 25 which encloses a ball link 26 disposed at the end of the rod 4, and is prevented from rotating relatively to the sliding block 25. The compressed air is directed to the machine from a pressure source through a pipe 36 leading to a rotary slide valve 37 driven by the shaft 22 and having connections to each of the pipes 32—35 and an outlet 38 to the atmosphere.

The rod 4 is electrically insulated from the frame 1, 2. The current required for the welding is directed by way of a conductor 27 to the rod 4, which thus forms the one pole, and by way of a conductor 28 to the frame 1, 2, and from there to the pole members 8, which thus form the other pole.

The two conductors 27 and 28 are connected to fixed poles 39 and 40 which are situated in alignment with reciprocating poles 41 and 42 fixed upon a slide 43 with a roller 44 engaging an eccentric cam disc 45 on the shaft 22 hereby closing and breaking the electric current in tune with the working of the slide valve 37.

The machine is operated in such a manner that the radiator units to be welded together are disposed in the front face of the guide 6, after which the clamping poles 8 are moved down about the necks to be welded together, in such a manner that they rest firmly against the same. Then the machine is started, i. e. the main shaft 29, which carries a pulley 46, is set in rotation, whereby the worm 16 and the worm wheel 14 are rotated and, at the same time, compressed air is directed alternately to the two cylinders 23, in such a manner that the sliding block 25 is moved forward and back between the latter. Hereby the lever 4 is set into an oscillating and, at the same time, rotary motion, in such a manner that the projections 12 are pressed firmly into contact with the inner face of the joint, in the manner indicated in Fig. 4. When the lever 4 has been turned half a revolution, the machine is stopped, and the radiator units welded together are removed. When the next welding shall be executed, the handle 31 is operated to reverse the rotation of the shaft 22, in order to obviate twining of the pipes 32—35.

Instead of air cylinders 23 for moving the lever 4, other moving mechanisms may be used, for instance solenoids co-operating with cores disposed on the lever 4. Also a purely mechanical moving mechanism may be used, but the same should be resilient, in such a manner that the projections 12 will rest with a constant pressure against the inner face of the joint, no matter whether or not the latter be centered accurately, relatively to the axis for the lever 4.

When the question is to weld radiator units together, there will be two openings to be welded together in each unit. In such cases it will be preferable to make the machine double, in such a manner that both of the two openings can be welded simultaneously, as hereby essential clamping operations will be saved.

I claim:

A device for the electric welding of annular joints, comprising a stationary electrode to be applied to the outside of the joint, a rotary member to project into the joint, two electrodes projecting radially from said rotary element in diametrically opposite directions towards the inner periphery of the joint, means to supply said electrodes with welding current, means to rotate said rotary member in said joint, and means controlled by said rotating means to impart a radial reciprocation to said member, to alternately press one and the other of said two radially projecting electrodes against the inner periphery of the joint.

HENRIK FREDERIK
MOLDRUP HOLLESEN.